United States Patent
Kawamura et al.

(10) Patent No.: US 10,234,056 B2
(45) Date of Patent: Mar. 19, 2019

(54) CONTROL DEVICE FOR ACTUATOR, ACTUATOR, VALVE DRIVING DEVICE AND ABNORMALITY DETECTING METHOD FOR ACTUATOR

(71) Applicant: MITSUBISHI ELECTRIC CORPORATION, Tokyo (JP)

(72) Inventors: Satoshi Kawamura, Tokyo (JP); Kenta Hatano, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 15/540,741

(22) PCT Filed: Apr. 6, 2015

(86) PCT No.: PCT/JP2015/060742
§ 371 (c)(1),
(2) Date: Jun. 29, 2017

(87) PCT Pub. No.: WO2016/162924
PCT Pub. Date: Oct. 13, 2016

(65) Prior Publication Data
US 2017/0370498 A1 Dec. 28, 2017

(51) Int. Cl.
*F16K 31/04* (2006.01)
*F16K 37/00* (2006.01)
(Continued)

(52) U.S. Cl.
CPC ........ *F16K 37/0041* (2013.01); *F02B 37/186* (2013.01); *F02D 13/02* (2013.01);
(Continued)

(58) Field of Classification Search
CPC ..... F16K 1/16; F16K 1/18; F16K 1/20; F16K 37/00; F16K 37/0025; F16K 37/0033;
(Continued)

(56) References Cited

U.S. PATENT DOCUMENTS 4,292,949 A * 10/1981 Bendig .................. F02M 31/07
  123/552
7,351,179 B2 * 4/2008 Spickard .................. H02K 7/06
  137/330
(Continued)

FOREIGN PATENT DOCUMENTS

JP  2003-106185 A  4/2003
JP  2006-60982 A   3/2006
(Continued)

OTHER PUBLICATIONS

Office Action issued in corresponding Japanese Patent Application No. 2017-510812 dated Feb. 6, 2018 with an English Translation.

*Primary Examiner* — Matthew W Jellett
(74) *Attorney, Agent, or Firm* — Birch, Stewart, Kolasch & Birch, LLP

(57) ABSTRACT

A control device for a WG actuator includes a feedback control unit for performing feedback control on the WG actuator in such a way that the position of a shaft detected by a position sensor gets close to a target position, and an abnormality detecting unit for providing an instruction to move the shaft in an axial direction for the feedback control unit, and for detecting an abnormality in the WG actuator on the basis of a result of a movement of the shaft, the movement being detected by the position sensor while the feedback control unit performs the instruction.

7 Claims, 5 Drawing Sheets

(51) Int. Cl.
- *F02D 13/02* (2006.01)
- *H02K 11/21* (2016.01)
- *H02P 29/024* (2016.01)
- *F02B 37/18* (2006.01)
- *F02D 41/22* (2006.01)
- *F16K 1/16* (2006.01)
- *H02K 7/06* (2006.01)
- *F16K 31/52* (2006.01)
- *F16K 1/20* (2006.01)
- *F16K 31/44* (2006.01)
- *F02D 41/04* (2006.01)

(52) U.S. Cl.
CPC .............. *F02D 41/221* (2013.01); *F16K 1/16* (2013.01); *F16K 1/2007* (2013.01); *F16K 31/042* (2013.01); *F16K 31/043* (2013.01); *F16K 31/046* (2013.01); *F16K 31/521* (2013.01); *H02K 7/06* (2013.01); *H02K 11/21* (2016.01); *H02P 29/024* (2013.01); *H02P 29/0241* (2016.02); *F02D 41/042* (2013.01); *F16K 31/44* (2013.01); *Y02T 10/144* (2013.01); *Y02T 10/40* (2013.01)

(58) Field of Classification Search
CPC .. F16K 37/0041; F16K 37/0083; F16K 31/02; F16K 31/04; F16K 31/041; F16K 31/042; F16K 31/043; F02D 13/02
See application file for complete search history.

(56) References Cited

U.S. PATENT DOCUMENTS

| | | | |
|---|---|---|---|
| 7,516,642 B2* | 4/2009 | Seethaler | F01L 1/04 73/1.79 |
| 2006/0043817 A1 | 3/2006 | Nagai et al. | |
| 2008/0036415 A1* | 2/2008 | Kaizuka | H02P 21/0003 318/730 |
| 2009/0043479 A1* | 2/2009 | Noda | F02D 13/02 701/103 |
| 2011/0048102 A1* | 3/2011 | Fernandez | G01D 5/2448 73/1.79 |
| 2011/0080126 A1* | 4/2011 | Yabuguchi | H02P 21/0003 318/400.21 |
| 2013/0069579 A1* | 3/2013 | Uematsu | H02P 29/64 318/473 |
| 2013/0104386 A1* | 5/2013 | Savio | H02P 21/0003 29/598 |
| 2014/0026559 A1 | 1/2014 | Shinagawa | |
| 2017/0104430 A1* | 4/2017 | Magee | H02P 21/0003 |
| 2018/0003103 A1* | 1/2018 | Kawamura | H05K 7/06 |
| 2018/0041156 A1* | 2/2018 | Kawamura | B60L 15/20 |
| 2018/0066574 A1* | 3/2018 | Kawamura | F02B 37/18 |
| 2018/0178828 A1* | 6/2018 | Tsubaki | H02P 21/22 |

FOREIGN PATENT DOCUMENTS

| | | |
|---|---|---|
| JP | 2006-274833 A | 10/2006 |
| JP | 2009-235959 A | 10/2009 |
| JP | 2010-168909 A | 8/2010 |
| JP | 2014-163403 A | 9/2014 |
| WO | WO 2012/017476 A1 | 2/2012 |
| WO | WO 2012/137345 A1 | 10/2012 |

* cited by examiner

CONTROL DEVICE FOR ACTUATOR, ACTUATOR, VALVE DRIVING DEVICE AND ABNORMALITY DETECTING METHOD FOR ACTUATOR

TECHNICAL FIELD

The present invention relates to a control device for an actuator for driving an object to be driven, such as a valve, an actuator, a valve driving device and an abnormality detecting method for an actuator.

BACKGROUND ART

Although an actuator that causes a shaft to reciprocate in an axial direction may fall into an abnormal state in which the entire reciprocating motion range of the shaft cannot be used due to the adhesion of a foreign object or the deformation of a component, the actuator itself does not have a function of detecting an abnormality in the shaft. Therefore, for example, when an actuator used for vehicle-mounted equipment, such as a turbocharger, (for example, refer to Patent Literature 1) falls into an abnormal state, it becomes possible to suspect that an abnormality occurs in the actuator only after a malfunction has occurred in the vehicle-mounted equipment while the vehicle is travelling.

CITATION LIST

Patent Literature

Patent Literature 1: WO 2012/137345

SUMMARY OF INVENTION

Technical Problem

As mentioned above, a problem with the conventional actuator is that because the actuator does not have a function of detecting an abnormality in the shaft, an abnormality in the shaft cannot be detected before the actuator is used.

The present invention is made in order to solve the above-mentioned problem, and it is therefore an object of the present invention to provide a technique for detecting an abnormality in the shaft of an actuator.

Solution to Problem

According to the present invention, there is provided a control device for an actuator, the control device including: a feedback controller to perform feedback control on the actuator in such a way that the position of a shaft detected by a position sensor gets close to a target position; and an abnormality detector to provide an instruction to move the shaft in an axial direction for the feedback controller, and to detect an abnormality in the actuator on the basis of a result of a movement of the shaft, the movement being detected by the position sensor while the feedback controller performs the instruction.

Advantageous Effects of Invention

Because, according to the present invention, an abnormality is detected on the basis of a result of the movement of the shaft detected by the position sensor while the feedback control unit performs instructions to move the shaft in an axial direction, an abnormality in the shaft of the actuator can be detected.

DESCRIPTION OF EMBODIMENTS

Hereafter, in order to explain this invention in greater detail, an embodiment of the present invention will be described with reference to the accompanying drawings.

Embodiment 1

A case of using an actuator according to the present invention as a wastegate (hereinafter referred to as WG) actuator that drives a WG valve of a turbocharger that is mounted in a vehicle will be explained as an example.

Figure 1:
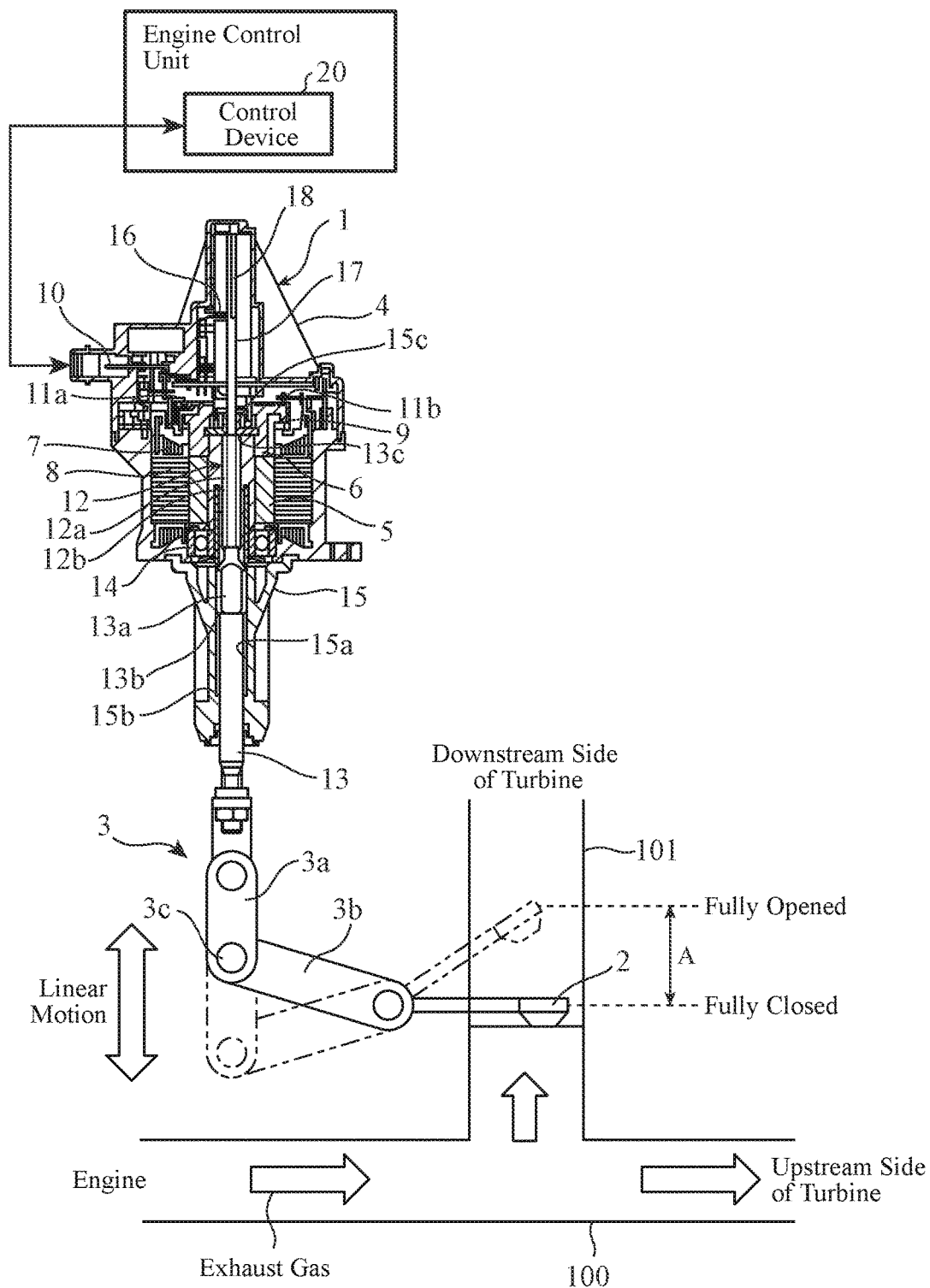
FIG. 1 is a cross-sectional view showing an example of the configuration of a wastegate actuator according to Embodiment 1 of the present invention.

FIG. 1 is a cross-sectional view showing an example of the configuration of a WG actuator 1 according to Embodiment 1. The turbocharger is configured so as to rotate a turbine by using an exhaust gas from an engine, drive a compressor connected with this turbine on the same axis, to compress intake air, and supply this compressed intake air to the engine. A WG valve 2 for bypassing the exhaust gas from an exhaust passage 100 to a bypass passage 101 is disposed on an upstream side of the exhaust passage 100 with respect to the turbine. The number of rotations of the turbine is controlled by opening or closing the WG valve 2 to adjust the inflow of the exhaust gas from the exhaust passage 100 to the bypass passage 101 by means of the WG actuator 1. In FIG. 1, a solid line shows a fully closed state of the WG valve 2, and a chain double-dashed line shows a fully opened state of the WG valve 2. The WG actuator 1 adjusts the degree of opening of the WG valve 2 selectively within a range (hereinafter referred to as a movable range A) from a fully closed position to a fully opened position.

The WG actuator 1 includes a direct-current motor 4 that serves as a driving source, a shaft 13 that opens and closes the WG valve 2, and a screw mechanism 12 that converts a rotary motion of the direct-current motor 4 into a linear motion of the shaft 13. The direct-current motor 4 includes a rotor 6 having a magnet 5 magnetized into a plurality of N and S poles, and a stator 8 on which coils 7 are wound. Brushes 11b are connected with ends of the coils 7. The rotor 6 is rotatably supported by a bearing portion 14 on one end side thereof, and a commutator 9 is fixed on the other end side of the rotor 6.

When a voltage is applied to an external terminal 10, currents flow through commutator bars in contact with brushes 11a, among plural commutator bars which configure the commutator 9, via the brushes 11a connected with this external terminal 10, and currents flow through the coils 7 via the brushes 11b electrically connected with these commutator bars. The stator 8 is magnetized into an N pole and an S pole by the passage of the currents through the coils 7, and the N pole and the S pole of the stator 8 repel and attract the N pole and the S pole of the magnet 5 and this causes the rotor 6 to rotate. As the rotor 6 rotates, the coils 7 through which the currents are made to pass are changed and, as a result, the poles of the stator 8 are also changed and the rotor 6 continues rotating. When the directions of the currents are reversed, the direction of rotation of the rotor 6 is also reversed.

Although a DC motor with brushes is used as the direct-current motor 4 in the example shown in FIG. 1, a brushless DC motor can be alternatively used.

A hole used for disposing the shaft 13 therein is made inside the rotor 6, and a female screw portion 12a is formed on an inner circumferential surface of the hole and a male screw portion 12b is formed on an outer circumferential surface of the shaft 13. This male screw portion 12b is screwed into and coupled with the female screw portion 12a, and a rotary motion of the rotor 6 is converted into a linear motion of the shaft 13. The screw mechanism 12 consists of these female screw portion 12a and male screw portion 12b. One end of the shaft 13 penetrates the housing 15, and is joined to the WG valve 2 via a linkage mechanism 3. A position sensor 16 for detecting the position of this shaft 13 in an axial direction, and so on are disposed on the other end side of the shaft 13.

The linkage mechanism 3 has two plates 3a and 3b. The shaft 13 is attached on one end side of the plate 3a, and one end of the plate 3b is attached rotatably to a supporting point 3c disposed on the other end side of the plate 3a. The WG valve 2 is attached on the other end side of this plate 3b. When the shaft 13 moves in a direction in which the shaft is pushed out from the housing 15 in response to a rotation in one direction of the rotor 6, the plate 3a also moves in the same direction, and the plate 3b and the WG valve 2 rotate around the supporting point 3c, and the WG valve 2 moves in a valve opening direction. When the shaft 13 moves in a direction in which the shaft is retracted into the housing 15 in response to a rotation in a reverse direction of the rotor 6, the plate 3a also moves in the same direction, and the plate 3b and the WG valve 2 rotate around the supporting point 3c, and the WG valve 2 moves in a valve closing direction.

Two flat surfaces or the likes are formed on the shaft 13, and function as a rotation limiting portion 13a. Further, on an inner circumferential surface of a hole of the housing 15 which the shaft 13 penetrates, a guide portion 15a, such as two flat surfaces, is formed in such a way as to have a shape matching the shape of the rotation limiting portion 13a. Sliding between the rotation limiting portion 13a and the guide portion 15a prevents the shaft 13 from rotating in synchronization with a rotation of the rotor 6, to support the shaft 13 in such a way as to cause the shaft 13 to make a linear motion. A stopper 15b projecting toward the shaft 13 is formed at an end of the guide portion 15a. By causing a butting portion 13b which is shaped so as to project from the shaft 13 to come into contact with this stopper 15b, the shaft 13 is prevented from further making a linear motion in a valve opening direction. Similarly, a plate that functions as a stopper 15c is disposed at an end of the screw mechanism 12. By causing an end surface of the shaft 13 that functions as a butting portion 13c to come into contact with the stopper 15c, the shaft 13 is prevented from further moving in a valve closing direction.

In the plate that functions as the stopper 15c for the shaft 13, a hole having a diameter smaller than the outer diameter of the shaft 13 penetrates, and a shaft for sensor 17 is made to pass through this hole, and an end surface of the shaft for sensor 17 is in contact with the end surface of the shaft 13. As a result, the shaft for sensor 17 also reciprocates in synchronization with a reciprocating motion in the axial direction of the shaft 13. A magnet for sensor 18 is fixed to this shaft for sensor 17, and, when the position of the magnet for sensor 18 with respect to the position sensor 16 changes due to a reciprocating motion of the shaft 13, a flux density passing through the position sensor 16 also changes. The position sensor 16 is a Hall element or a magnetoresistive element, and detects the flux density which changes due to the reciprocating motion of the shaft 13 and converts the flux density into an analog signal showing an actual stroke position of the shaft 13 and outputs the analog signal.

Figure 2:
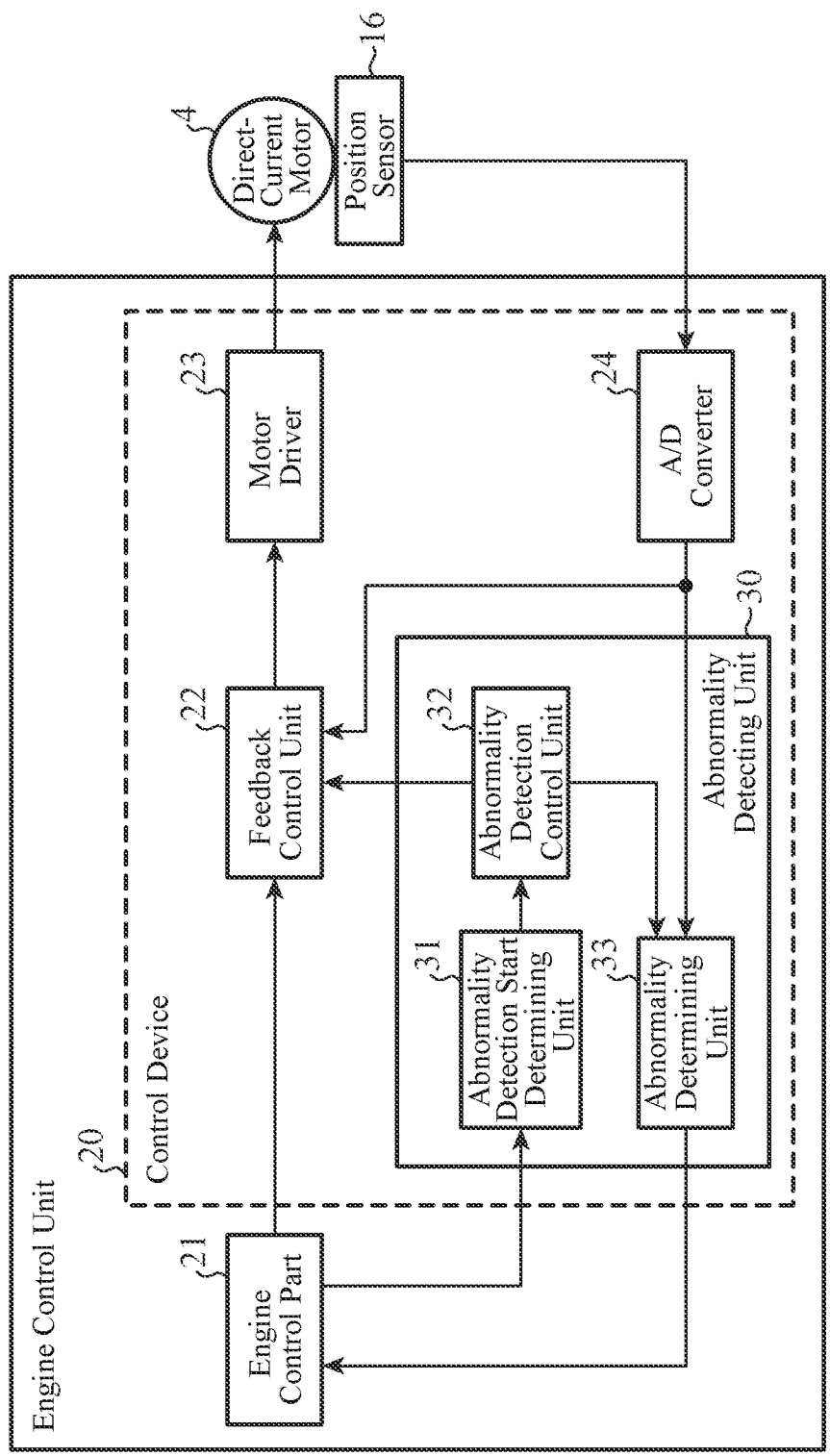
FIG. 2 is a block diagram showing an example of the configuration of a control device for the wastegate actuator according to Embodiment 1.

FIG. 2 is a block diagram showing an example of the configuration of a control device 20. The control device 20 mainly includes a function of controlling the WG actuator 1 to adjust the degree of opening of the WG valve 2, and a function of detecting an abnormality in the WG actuator 1. Although in the illustrated example the functions of the control device 20 are configured so as to be implemented as one function of an engine control unit, the control device 20 can be alternatively configured as an independent electronic control unit or can be alternatively incorporated, as a circuit board, into the WG actuator 1.

The engine control unit includes an engine control part 21 and the control device 20, and illustration and explanation of components other than these components will be omitted hereafter. The control device 20 includes a feedback control unit 22, a motor driver 23, an A/D converter 24 and an abnormality detecting unit 30. The abnormality detecting unit 30 includes an abnormality detection start determining unit 31, an abnormality detection control unit 32 and an abnormality determining unit 33.

The engine control part 21 outputs a target stroke position of the shaft 13 to the feedback control unit 22. The engine control part 21 also outputs vehicle information showing the state of a vehicle to the abnormality detection start determining unit 31. The vehicle information is, for example, information showing the on/off state of an ignition (IG) key, this information showing that the engine has been started or stopped.

Further, when an abnormality in the WG actuator 1 is detected by the abnormality detecting unit 30, the engine control part 21 receives a notification to that effect from the abnormality determining unit 33. When receiving a notification of the detection of an abnormality from the abnormality determining unit 33, the engine control part 21 lights a warning lamp of the instrument panel, for example.

The A/D converter 24 receives the analog signal showing the actual stroke position of the shaft 13 outputted by the position sensor 16, converts the analog signal into a digital signal showing the actual stroke position, and outputs the digital signal to the feedback control unit 22 and the abnormality determining unit 33.

The feedback control unit 22 performs feedback control on the stroke position of the shaft 13 in such a way that the actual stroke position received from the A/D converter 24 gets close to the target stroke position received from the engine control part 21. By performing the feedback control on the stroke position of the shaft 13, the degree of opening of the WG valve 2 joined to the shaft 13 is adjusted. For example, when performing PID control, the feedback control unit 22 calculates the difference between the target stroke position and the actual stroke position, calculates amounts of operation which are a proportional term, an integral term and a differential term, these terms corresponding to the difference, to calculate a drive duty, generates a PWM (Pulse Width Modulation) control signal corresponding to the drive duty, and outputs the PWM control signal to the motor driver 23.

Further, when receiving an instruction to move the shaft 13 in an axial direction for the purpose of an abnormality detecting process from the abnormality detection control unit 32, the feedback control unit 22 interrupts the above-mentioned feedback control which is performed at normal times, generates a PWM control signal to cause the shaft 13 to move in accordance with the instruction from the abnormality detection control unit 32, and outputs the PWM control signal to the motor driver 23.

As a range within which the shaft 13 is moved for the purpose of the abnormality detecting process, for example, a range within which the WG valve 2 is moved from a fully closed position to a fully opened position with a movement of the shaft 13 at normal times, i.e., the movable range A shown in FIG. 1 is set. Further, for the purpose of the abnormality detecting process, the shaft 13 can be moved only in one direction which is the valve opening direction or the valve closing direction within the movable range A of the WG valve 2, or can be made to reciprocate within the range.

The motor driver 23 performs on/off control on a voltage applied to the direct-current motor 4 in accordance with the PWM control signal which the motor driver 23 receives from the feedback control unit 22, to adjust a current passing through the direct-current motor 4.

The abnormality detection start determining unit 31 determines whether or not to start the abnormality detecting process on the WG actuator 1, on the basis of the vehicle information received from the engine control part 21. When determining the start of the abnormality detecting process, the abnormality detection start determining unit transmits a notification to that effect to the abnormality detection control unit 32. For example, in a case in which the vehicle information shows the on/off state of the IG key, when the IG key enters an on state or an off state, the abnormality detection start determining unit 31 determines the start of the abnormality detecting process.

When receiving a notification of the start of the abnormality detecting process from the abnormality detection start determining unit 31, the abnormality detection control unit 32 outputs an instruction to move the shaft 13 to the feedback control unit 22. The abnormality detection control unit 32 also notifies the abnormality determining unit 33 that the process of moving the shaft 13 is being performed as the abnormality detecting process.

When receiving a notification of execution of the abnormality detecting process from the abnormality detection control unit 32, the abnormality determining unit 33 receives the actual stroke position of the shaft 13 which is made to be moving through this abnormality detecting process from the A/D converter 24, and determines an actual stroke range of the shaft 13. The abnormality determining unit 33 compares this actual stroke range with a predetermined range for determination, to determine whether or not an abnormality has occurred in the reciprocating motion of the shaft 13, and, when determining that an abnormality has occurred, notifies the engine control part 21 of the detection of the abnormality. For example, when the actual stroke range is narrower than the range for determination or when the actual stroke range is shifted from the range for determination, the abnormality determining unit 33 determines that an abnormality has occurred in the WG actuator 1. The range for determination is a range for determining whether the actual stroke range of the shaft 13 is normal or abnormal. For example, when the shaft 13 is made to reciprocate within the movable range A of the WG valve 2 in the abnormality detecting process, a movement range of the shaft 13 or the like corresponding to this movable range A is set as the range for determination.

In addition, the abnormality determining unit 33 can transmit not only a notification of the detection of an abnormality, but also a notification of a determination result which the abnormality determining unit provides by determining a reciprocating motion range within which it can be used properly, to the engine control part 21.

Next, the movement range of the shaft 13 in the abnormality detecting process will be explained. Although in the above-mentioned explanation the movable range A is shown as an example of the movement range in the abnormality detecting process, the movement range is not limited to this movable range A.

For example, when a maximum reciprocating motion range of the shaft 13 is a range extending from a position where the stopper 15*b* and the butting portion 13*b* are in contact with each other to a position where the stopper 15*c* and the butting portion 13*c* are in contact with each other, and this maximum reciprocating motion range is set to be substantially the same as the movable range A of the WG valve 2, it is preferable to use the movable range A as the movement range in the abnormality detecting process, as previously explained.

In contrast, when the maximum reciprocating motion range of the shaft 13 is set to be greater than the movable range A, the movable range A or the maximum reciprocating motion range can be used as the movement range in the abnormality detecting process.

Further, in a case in which, for example, a DC motor with brushes as shown in FIG. 1 is used as the direct-current motor 4, when the time period during which the commutator 9 and the brushes 11*a* and 11*b* are not in contact with each other becomes longer, an oxide film may be formed on the commutator 9 and this may cause a current passage failure. The WG valve 2 does not use the whole of the movable range A uniformly while the vehicle is travelling, and the frequency with which the movable range A is used is uneven among sections of the movable range, for example, the frequency with which a certain section of the movable range A is used is high while the frequency with which another section of the movable range A is used is low. The rotor 6 thus rotates forward and backward in small steps within a narrow angle, and, in the commutator 9, a portion which is in contact with the brushes 11*a* and 11*b* for a long time and a portion which is in contact with the brushes 11*a* and 11*b* for a short time appear, and therefore an oxide film is easily formed on the portion which is in contact with the brushes for a short time.

Thus, a range within which the rotor 6 of the direct-current motor 4 makes one or more rotations is used as the movement range of the shaft 13 in the abnormality detecting process, and the commutator 9 is made to rotate integrally with the rotor 6, thereby removing the oxide film adhered to the commutator 9 by using the brushes 11*a* and 11*b*.

Figure 3:
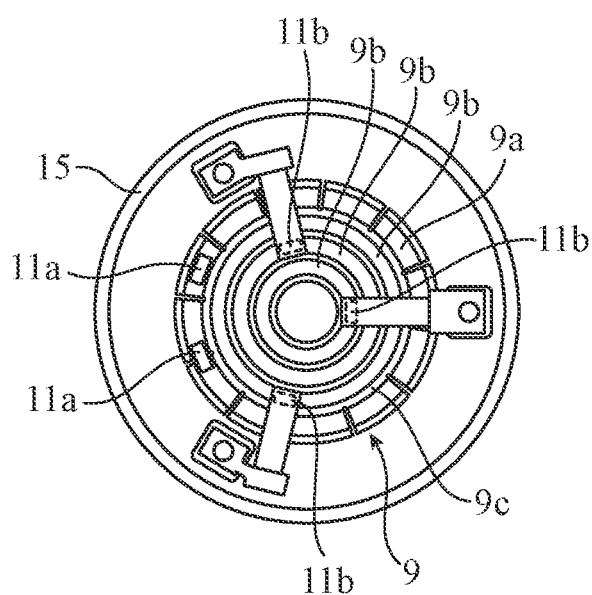
FIG. 3 is a plane view showing an example of the configuration of a commutator according to Embodiment 1.

FIG. 3 shows an example of the configuration of the commutator 9 which is used for the direct-current motor 4 of the WG actuator 1, and is a plane view of the commutator 9 when viewed from the side of the position sensor 16 in FIG. 1. The direct-current motor 4 is a DC motor with brushes. Four conductive paths are concentrically formed on an end surface of the commutator 9, and the conductive path located on the outermost side is the commutator bar 9a and the three conductive paths located inside are slip rings 9b of phase U, phase V and phase W. These four conductive paths are disposed in an insulating member 9c. The positive pole brush 11a and the negative pole brush 11a are energized by a not-shown spring member and are pressed against the commutator bar 9a. The brush 11b of each phase connected with the corresponding coil 7 is energized by a flat spring and is pressed against the corresponding slip ring 9b of each phase. The commutator bar 9a is divided into multiple portions along a circumferential direction, in order to switch a current flowing through the slip ring 9b of each phase in accordance with the rotation angle of the rotor 6. Each of the portions after division is connected with the corresponding slip ring 9b of each phase inside the insulating member 9c. The current which is switched in accordance with the rotation angle of the rotor 6 by the commutator bar 9a flows from the slip ring 9b of each phase into the corresponding coil 7 via the corresponding brush 11b.

In the example of the configuration shown in FIG. 3, when the rotor 6 is made to make one or more rotations at a time of moving the shaft 13 in an axial direction in the abnormality detecting process, the brushes 11a and 11b slide once around uniformly on the commutator bar 9a and the slip rings 9b and scrape the oxide film, so that a favorable current passage state can be obtained.

In addition, because the rotor 6 rotates repeatedly, and the brushes 11a and 11b slide multiple times around on the commutator bar 9a and the slip rings 9b by causing the shaft 13 to repeatedly move in the axial direction a number of times in the abnormality detecting process, the oxide film can be scraped more surely and a better current passage state can be obtained.

Figure 4:
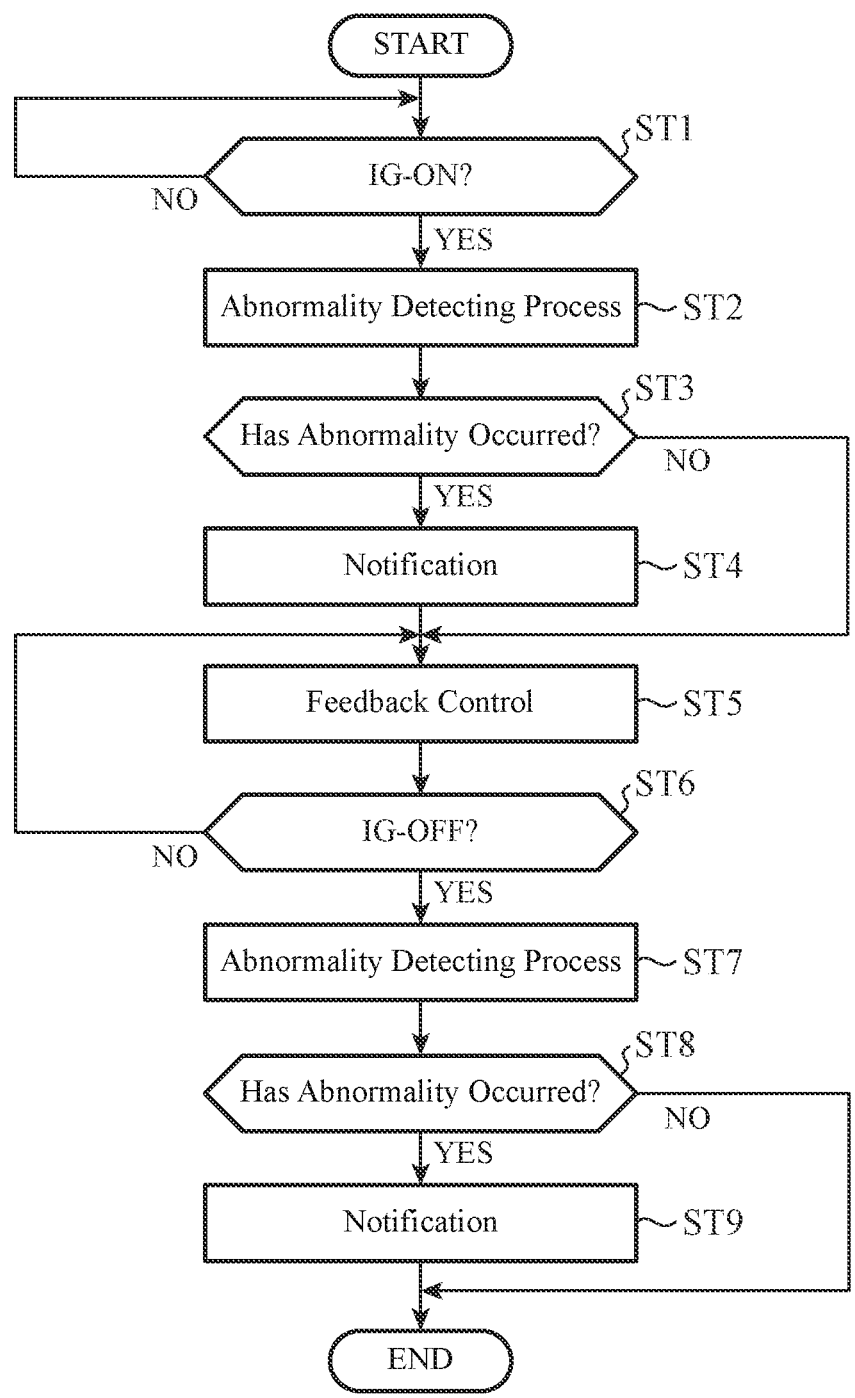
FIG. 4 is a flow chart showing an operation which is performed by an abnormality detecting unit in the control device for the wastegate actuator according to Embodiment 1.

FIG. 4 is a flow chart showing the operation of the abnormality detecting unit 30.

The abnormality detection start determining unit 31 determines whether or not the IG key has entered the on state on the basis of the vehicle information received from the engine control part 21 (step ST1). When determining that the IG key has entered the on state, the abnormality detection start determining unit notifies the abnormality detection control unit 32 of the start of the abnormality detecting process ("YES" in step ST1), otherwise, repeats the process of step ST1 ("NO" in step ST1).

When receiving the notification of the start of the abnormality detecting process from the abnormality detection start determining unit 31 ("YES" in step ST1), the abnormality detection control unit 32 outputs an instruction to move the shaft 13 to the feedback control unit 22 (step ST2). The feedback control unit 22 controls the WG actuator 1 in accordance with this instruction, to move the shaft 13. The abnormality determining unit 33 receives, via the A/D converter 24, the actual stroke position of the shaft 13 which is detected by the position sensor 16 while the shaft 13 is moving, to determine an actual stroke range of the shaft 13. The abnormality determining unit 33 then determines an abnormality in the WG actuator 1 by making a comparison between this actual stroke range and the range for determination (step ST3). When determining that an abnormality has occurred in the WG actuator 1 ("YES" in step ST3), the abnormality determining unit 33 notifies the engine control part 21 of the detection of the abnormality (step ST4), otherwise, skips the process of step ST4. After the abnormality detecting process is ended, the abnormality detection control unit 32 instructs the feedback control unit 22 to return to the normal feedback control (step ST5).

As mentioned above, because the abnormality detecting process is performed immediately after the IG key has entered the on state, an abnormality in a reciprocating motion of the shaft 13 can be detected before the vehicle starts to travel, that is, before the WG actuator 1 is used. Further, in the case in which the direct-current motor 4 of the WG actuator 1 is a DC motor with brushes, because an oxide film on the commutator 9 can be removed at the same time that the abnormality detecting process is performed, a good current passage state can be obtained before the WG actuator is used. Therefore, an abnormal situation in which the shaft 13 cannot reciprocate properly due to the adhesion of a foreign object or the deformation of a component can be detected in advance.

When the vehicle information showing that the IG key has entered the off state is outputted from the engine control part 21 to the abnormality detection start determining unit 31 while the feedback control unit 22 performs the normal feedback control in step ST5, the abnormality detection start determining unit 31 determines the start of the abnormality detecting process, and notifies the abnormality detection control unit 32 of the start of the abnormality detecting process ("YES" in step ST6). Otherwise ("NO" in step ST6), the feedback control unit 22 continues the normal feedback control.

Because the processes of steps ST7 to ST9 are the same as the above-mentioned processes of steps ST2 to ST4, an explanation of the processes of steps ST7 to ST9 will be omitted. Because the abnormality detecting process is performed immediately after the IG key has entered the off state, an abnormality in a reciprocating motion of the shaft 13 can be detected before the vehicle starts to travel the next time, that is, before the WG actuator 1 is used the next time.

Although, in the flow chart of FIG. 4, the abnormality detecting process (steps ST2 and ST7) is performed when the IG key has entered the on state and when the IG key has entered the off state, the abnormality detecting process can be alternatively performed only when the IG key has entered the on state or only when the IG key has entered the off state. Further, when the abnormality detecting process is performed in both the steps ST2 and ST7, the range within which the shaft 13 is moved can be changed. In a state immediately after the IG key has entered the on or off state, no influence is imposed on the turbocharger even if the WG valve 2 is repeatedly placed in the fully closed state and in the fully opened state for the purpose of performing the abnormality detecting process. The time at which the abnormality detecting process is performed is not limited to the time of switching on or off the IG key, but may be any time as long as the operation of the turbocharger is not affected by the abnormality detecting process.

Figure 5:
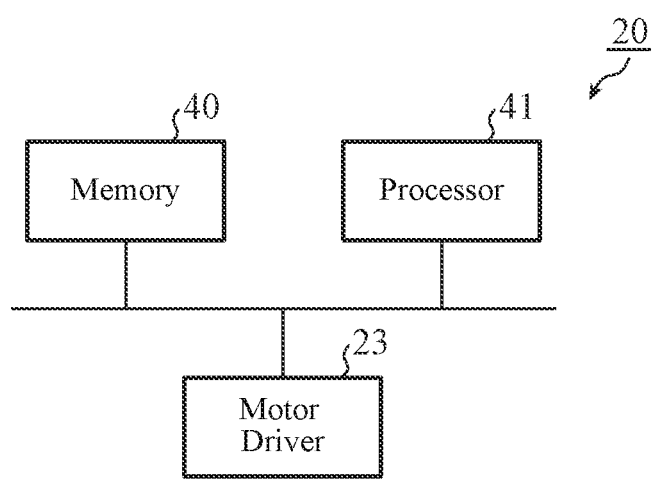
FIG. 5 is a diagram showing an example of the hardware configuration of the control device for the wastegate actuator according to Embodiment 1.

Next, an example of the hardware configuration of the control device 20 will be explained using FIG. 5.

The motor driver 23 is comprised of a switching element or the like that switches on and off the voltage applied to the direct-current motor 4. The feedback control unit 22, the A/D converter 24 and the abnormality detecting unit 30 are implemented by a processor 41 that executes a program stored in a memory 40. The processor 41 is a processing circuit such as a CPU or a system LSI. The memory 40 stores the movement range of the shaft 13, the range for determination and so on which are used in the abnormality detecting process, in addition to the above-mentioned program. Plural processors and plural memories can perform the above-mentioned functions in cooperation with one another.

As mentioned above, according to Embodiment 1, because the control device 20 for the WG actuator 1 is configured so as to include the feedback control unit 22 that performs feedback control on the WG actuator 1 in such a way that the position of the shaft 13 detected by the position sensor 16 gets close to the target position, and the abnormality detecting unit 30 that provides the instruction to move the shaft 13 in the axial direction for the feedback control unit 22, and that detects an abnormality in the WG actuator 1 on the basis of a result of a movement of the shaft 13 which is detected by the position sensor 16 while the feedback control unit 22 performs the instruction, the control device can detect the abnormality in the shaft 13.

Further, according to Embodiment 1, the WG actuator 1 drives the WG valve 2 which is an object to be driven by using the reciprocating motion in the axial direction of the shaft 13, and the abnormality detecting unit 30 can determine a reciprocating motion range of the shaft 13 within which the shaft can be used properly by setting the movable range A of the WG valve 2 as the range within which the shaft 13 is moved in the axial direction.

Further, because according to Embodiment 1, the direct-current motor 4 has the commutator bar 9a and the slip rings 9b which are conductive paths which rotate integrally with the rotor 6, and the brushes 11a and 11b which are pressed onto the conductive paths, and the abnormality detecting unit 30 sets a range within which the rotor 6 make one or more rotations as the range within which the shaft 13 is moved in the axial direction, an oxide film adhered to the conductive paths is scraped, and a good current passage state can be obtained at the same time that the abnormality detecting process is performed.

In addition, the abnormality detecting unit 30 can obtain a good current passage state more surely by causing the shaft 13 to repeatedly move in the axial direction a number of times.

Further, according to Embodiment 1, the abnormality detecting unit 30 can perform the abnormality detecting process without exerting an influence on the operation of the turbocharger, by performing detection of an abnormality in the WG actuator 1 when the engine of the vehicle is started or stopped.

In the present invention, it is to be understood that various changes can be made in any component according to the embodiment, or any component according to the embodiment can be omitted within the scope of the invention.

Although in the above-mentioned explanation the WG valve is mentioned as an example of the object to be driven which is driven by the actuator according to the present invention, the present invention is not limited to this example. An exhaust gas recirculation (EGR) valve mounted in the engine, a movable vane mounted in a variable geometry (VG) turbocharger, or the like can be the object to be driven.

Further, although the configuration of joining the shaft of the actuator according to the present invention and the object to be driven by using the linkage mechanism is shown, a configuration of directly joining the shaft and the object to be driven without using the linkage mechanism can be alternatively provided.

Further, a valve driving device including the actuator according to the present invention, the valve which is the object to be driven, and the control device can be configured.

INDUSTRIAL APPLICABILITY

Because the control device for the actuator according to the present invention is configured so as to detect an abnormality in the actuator before the actuator is used, the control device for the actuator is suitable for use as a control device for an actuator that drives a WG valve, an EGR valve, a VG vane or the like which is mounted in a vehicle.

REFERENCE SIGNS LIST

1 WG actuator, 2 WG valve (object to be driven), 3 linkage mechanism, 3a, 3b plate, 3c supporting point, 4 direct-current motor, 5 magnet, 6 rotor, 7 coil, 8 stator, 9 commutator, 9a commutator bar (conductive path), 9b slip ring (conductive path), 9c insulating member, 10 external terminal, 11a, 11b brush, 12 screw mechanism, 12a female screw portion, 12b male screw portion, 13 shaft, 13a rotation limiting portion, 13b, 13c butting portion, 14 bearing portion, 15 housing, 15a guide portion, 15b, 15c stopper, 16 position sensor, 17 shaft for sensor, 18 magnet for sensor, 20 control device, 21 engine control part, 22 feedback control unit, 23 motor driver, 24 A/D converter, 30 abnormality detecting unit, 31 abnormality detection start determining unit, 32 abnormality detection control unit, 33 abnormality determining unit, 40 memory, 41 processor, 100 exhaust passage, 101 bypass passage, and A movable range.

The invention claimed is:

1. A control device for an actuator, the actuator including a shaft, a motor for causing the shaft to make a reciprocating motion in an axial direction, and a position sensor for detecting a position of the shaft, the control device comprising:
a feedback controller to perform feedback control on the actuator in such a way that an actual position of the shaft detected by the position sensor gets close to a target position; and
an abnormality detector to provide an instruction to move the shaft in the axial direction for the feedback controller, and to determine an abnormality in the actuator on a basis of a result of a movement of the shaft prior to use of the actuator, the movement being detected by the position sensor while the feedback controller performs the instruction,
wherein the actuator drives an object to be driven by using the reciprocating motion in the axial direction of the shaft,
the abnormality detector further determines, as a range in which the shaft is moved in the axial direction, a range of the target position in which the shaft is normally used, within a movable range of the object to be driven, and,
the abnormality detector controls the actuator in the determined range.

2. The control device for the actuator according to claim 1, wherein the motor has a conductive path which is rotated integrally with a rotor, and a brush which is pressed onto the conductive path, and the abnormality detector sets a range within which the shaft is moved in an axial direction to a range within which the rotor makes one or more rotations.

3. The control device for the actuator according to claim 2, wherein the abnormality detector repeats the movement in an axial direction of the shaft multiple times.

4. The control device for the actuator according to claim 1, wherein the actuator is mounted in a vehicle, and the abnormality detector performs detection of an abnormality in the actuator when an engine of the vehicle is started or stopped.

5. A driving device comprising:
the actuator and the control device according to claim 1.

6. A valve driving device comprising:
- the actuator and the control device according to claim 1; and
- a valve that is driven by the reciprocating motion in the axial direction of the shaft.

7. An abnormality detecting method for an actuator, the abnormality detecting method being used by a control device that performs feedback control on the actuator having a shaft, a motor for causing the shaft to make a reciprocating motion in an axial direction, and a position sensor for detecting a position of the shaft, in such a way that an actual position of the shaft detected by the position sensor gets close to a target position, and
- driving, by the actuator, an object to be driven by using the reciprocating motion in the axial direction of the shaft;
- by the control device, moving the shaft in the axial direction;
- determining an abnormality in the actuator on a basis of a result of a movement of the shaft prior to sue of the actuator, the movement being detected by the position sensor during the movement of the shaft;
- determining, as a range in which the shaft is moved in the axial direction, a range of the target position in which the shaft is normally used, within a movable range of the object to be driven; and
- controlling the actuator in the determined range.

* * * * *